(12) United States Patent
Yoshihara

(10) Patent No.: US 7,523,799 B2
(45) Date of Patent: Apr. 28, 2009

(54) SNOWMOBILE

(75) Inventor: Masanori Yoshihara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 541 days.

(21) Appl. No.: 11/346,516

(22) Filed: Feb. 2, 2006

(65) Prior Publication Data

US 2007/0175686 A1     Aug. 2, 2007

(51) Int. Cl.
*B62M 27/02* (2006.01)
(52) U.S. Cl. .................. 180/190; 180/193; 305/127
(58) Field of Classification Search .............. 180/182, 180/190, 193, 9.1, 9.25, 9.5, 9.54; 305/127, 305/116
See application file for complete search history.

(56) References Cited

U.S. PATENT DOCUMENTS

| | | | | |
|---|---|---|---|---|
| 3,944,005 A | * | 3/1976 | Tomita | ................ 180/193 |
| 4,462,480 A | * | 7/1984 | Yasui et al. | ................ 180/193 |
| 5,904,216 A | | 5/1999 | Furusawa | |
| 6,631,778 B2 | * | 10/2003 | Mallette | ................ 180/193 |
| 2004/0159483 A1 | * | 8/2004 | Imamura et al. | ............ 180/190 |
| 2006/0185919 A1 | * | 8/2006 | Hibbert et al. | ............... 180/190 |

* cited by examiner

*Primary Examiner*—Anne Marie M. Boehler
(74) *Attorney, Agent, or Firm*—Keating & Bennett, LLP

(57) ABSTRACT

A snowmobile includes a vehicle frame, a track belt to which driving force is transferred from an engine mounted on the vehicle frame, a guide rail guiding the track belt, a frontal connecting member rotatably connected to the vehicle frame and the guide rail in a front portion of the snowmobile, a rear connecting member rotatably connected to the vehicle frame and the guide rail in a rear portion of the snowmobile, a first link member rotatably connected to the frontal connecting member, and a second link member rotatably connected to the first link member and the guide rail, and a shock absorber rotatably connected to the first link member or the second link member via a first connecting member. The first connecting member is provided above a second connecting member connecting the guide rail and the second link member.

18 Claims, 9 Drawing Sheets

SNOWMOBILE

BACKGROUND OF THE INVENTION

1. Field of the Invention

The present invention relates generally to snowmobiles, and more particularly to mono-shock suspensions applicable to snowmobiles.

2. Description of the Related Art

In snowmobiles, mono-shock suspensions are generally known as a technology utilized for absorbing shocks generated from impacts with the snow surface. For example, according to FIG. 3 of U.S. Pat. No. 5,904,216, suspension link 72 and levers 83 are connected to tube 73, and an end portion of shock absorber 77 is connected to levers 83. In addition, links 88 and bracket arms 92 are connected to tubular member 89, and another end portion of shock absorber 77 is connected to bracket arms 92. Tube 73 and tubular member 89 are respectively fixed to frame assembly 53, and suspension link 72 and bracket arms 92 are each indirectly connected to guide rails 63. Therefore, shock absorber 77 is capable of absorbing and transferring shocks from guide rails 63 to frame assembly 53.

In the above-described mono-shock suspension, levers 83 are always positioned below tube 73, and shock absorber 77 is fixed to the lower end of levers 83. Therefore, when guide rails 63 and frame assembly 77 approach each other due to an impact on guide rails 63, the height of the lower end of shock absorber 77 and that of guide rails 63 become substantially equal, as shown in FIG. 4 of U.S. Pat. No. 5,904,216.

On the other hand, when the impact on guide rails 63 is small, the height between the lower end of shock absorber 77 and guide rails 63 differs significantly, as shown in FIG. 3 of U.S. Pat. No. 5,904,216. Therefore, in the above-described mono-shock suspension, the movable range of the lower end of shock absorber 77 is large, and a large stroke can be maintained in shock absorber 77.

However, it is difficult to maintain the rigidity of the vehicle in the case where the movable range of shock absorber 77 is large. Specifically, guide rails 63 are respectively provided on the left and right of the vehicle, and the rigidity of the vehicle should be maintained by connecting each guide rail 63 by a connecting member. However, according to the above-described technology, the lower end of shock absorber 77 is capable of approaching the region between the left and right guide rails 63, and hence the connecting member connecting each guide rail 63 cannot be arranged in a desirable position.

SUMMARY OF THE INVENTION

In order to overcome the problems described above, preferred embodiments of the present invention provide a snowmobile of which vehicle rigidity can be easily and sufficiently maintained while retaining a required stroke in the shock absorber.

A snowmobile according to a first preferred embodiment of the present invention includes a vehicle frame, a track belt to which driving force is transferred from an engine mounted on the vehicle frame, a guide rail guiding the track belt, a frontal connecting member rotatably connected to the vehicle frame and the guide rail in a front end of the snowmobile, a rear connecting member rotatably connected to the vehicle frame and the guide rail in a rear end of the snowmobile, a link mechanism connected to the frontal connecting member and the guide rail, and a shock absorber connected to the link mechanism and the rear connecting member, wherein the link mechanism includes a first link member rotatably connected to the frontal connecting member, and a second link member rotatably connected to the first link member and the guide rail, and the shock absorber is rotatably connected to the first link member or the second link member via a first connecting member, and the first connecting member is provided above a second connecting member connected to the guide rail and the second link member.

In one of the preferred embodiments, the guide rail is disposed on the left and the right of the snowmobile, and includes a guide rail connecting member connected to the guide rail disposed on the left and the right of the snowmobile, and the second link member is rotatably connected to the guide rail connecting member.

In another preferred embodiment, the first link member includes a third connecting member and a fourth connecting member; and the first connecting member is respectively connected to the second link member, the frontal connecting member, and the shock absorber; and the first connecting member is arranged in a position that is spaced apart from a first line segment connecting the third connecting member and the fourth connecting member.

In another preferred embodiment, the second link member includes the first connecting member, the second connecting member, and a third connecting member respectively connected to the shock absorber, the guide rail and the first link member; and the first connecting member connected to the shock absorber is arranged in a position that is spaced apart from a second line segment connecting the second connecting member and the third connecting member.

In one of the preferred embodiments, the sum of a first line segment and a second line segment is larger than a third line segment; the first line segment extending from a third connecting member connecting the first link member and the second link member to a fourth connecting member connecting the frontal connecting member and the first link member, the second line segment extending from the second connecting member to the third connecting member, and the third line segment extending from the fourth connecting member to the second connecting member; and the third connecting member is positioned further to the front of the snowmobile than the third line segment.

In another preferred embodiment, when the shock absorber is continuously compressed, the rate of movement of a third connecting member decreases continuously in a direction of a line extending from the axis of the shock absorber, the third connecting member which connects the first link member and the second link member.

In yet another preferred embodiment, when the shock absorber is continuously compressed, a variation of an interior angle formed by a fourth connecting member, a third connecting member and the second connecting member decreases continuously; the fourth connecting member connects the frontal connecting member and the first link member, and the third connecting member connects the first link member and the second link member.

In one of the preferred embodiments, a runout of a connecting member connecting the shock absorber to either the first link member or the second link member with respect to another connecting member of the shock absorber increases when the shock absorber is extended to its maximum and decreases or generally decreases when the shock absorber is being compressed.

In one of the preferred embodiments, the rate of movement of a connecting member connecting to the first link member and the second link member, according to the compression of the shock absorber, towards a direction of a line extending from the axis of the shock absorber is smaller when the shock absorber is compressed to its maximum as compared to the shock absorber extended to its maximum.

In another preferred embodiment, the variation of an interior angle formed by a connecting member connecting the frontal connecting member and the first link member, a connecting member connecting the first link member and the second link member, and a connecting member connecting the guide rail and the second link member, with respect to a unit of compression of the shock absorber, is smaller when the shock absorber is compressed to its maximum as compared to the shock absorber extended to its maximum.

In one of the preferred embodiments, the guide rail curves upwards at the front portion of the snowmobile and a buffer is provided at the front portion of the snowmobile, and a rotation restricting member, which restricts a rotation of the frontal connecting member by contacting the buffer, is arranged in the frontal connecting member.

In another preferred embodiment, either the first link member or the second link member or both the first link member and the second link member include(s) a plurality of connecting members that can be connected to the shock absorber.

A snowmobile according to another preferred embodiment of the present invention includes a vehicle frame, a track belt to which driving force is transferred from an engine mounted on the vehicle frame, a guide rail guiding the track belt, a frontal connecting member rotatably connected to the vehicle frame and the guide rail in a front end of the snowmobile, a rear connecting member rotatably connected to the vehicle frame and the guide rail in a rear end of the snowmobile, a first link member rotatably connected to the frontal connecting member, a second link member rotatably connected to the first link member and the guide rail, and a shock absorber connected to either the first link member or the second link member and the rear connecting member, wherein a first connecting member connecting the first link member and the second link member is positioned closer to the front of the snowmobile than a first line segment connecting a second connecting member connecting the frontal connecting member and the first link member and a third connecting member connecting the guide rail and the second link member, the shock absorber is arranged such that a line extending from the axis of the shock absorber intersects the first line segment, and a fourth connecting member connecting the shock absorber to either the first link member or the second link member is positioned above the third connecting member.

In one of the preferred embodiments, the guide rail is disposed on the left and the right of the snowmobile, and includes a guide rail connecting member connected to the guide rail disposed on the left and the right of the snowmobile, and the second link member is rotatably connected to the guide rail connecting member.

In one of the preferred embodiments, the first link member includes the first connecting member, the second connecting member and the fourth connecting member respectively connected to the second link member, the frontal connecting member, and the shock absorber; and the fourth connecting member is arranged in a position apart from a second line segment connecting the first connecting member and the second connecting member.

In another preferred embodiment, the second link member includes the fourth connecting member, the third connecting member and the first connecting member respectively connected to the shock absorber, the guide rail, and the first link member; and the fourth connecting member connected to the shock absorber is arranged at a position that is spaced apart from a third line segment connecting the third connecting member and the first connecting member.

In one of the preferred embodiments, the sum of a second line segment and a third line segment is larger than the first line segment; the second line segment extending from the first connecting member to the second connecting member, the third line segment extending from the third connecting member to the first connecting member, and the third line segment extending from the second connecting member to the third connecting member; and the first connecting member is positioned closer to the front of the snowmobile than the first line segment.

In one of the preferred embodiments, when the shock absorber is continuously compressed, the rate of movement of the first connecting member decreases continuously in a direction of a line extending from the axis of the shock absorber.

In another preferred embodiment, when the shock absorber is continuously compressed, a variation of an interior angle formed by the second connecting member, the first connecting member and the third connecting member decreases continuously.

In one of the preferred embodiments, the guide rail curves upwards at the front portion of the snowmobile and a buffer is provided at the front portion of the snowmobile, and a rotation restricting member, which restricts a rotation of the frontal connecting member by contacting the buffer, is arranged in the frontal connecting member.

In another preferred embodiment, either the first link member or the second link member or both the first link member and the second link member include(s) a plurality of connecting members that can be connected to the shock absorber.

In yet another preferred embodiment, the frontal connecting member includes a member that extends in the left-right direction of the vehicle body, the guide rail provided on the left and right of the snowmobile also includes a guide rail connecting member, and a connecting member connecting the frontal connecting member and the first link member, a connecting member connecting the first link member and the second link member, and a connecting member connecting the second link member and the guide rail are prevented from being positioned on a straight line by an elastic body connecting the member that extends in the left-right direction of the vehicle body and the guide rail connecting member.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereafter, preferred embodiments of the invention will be described with reference to the drawings. It should be noted that the terms "left", "right", "front", "rear", "up" and "down" used in this specification are defined, unless otherwise specified, according to the normal, forward traveling direction of the vehicle being described. The present invention however is not limited to the following preferred embodiments.

Figure 1A:
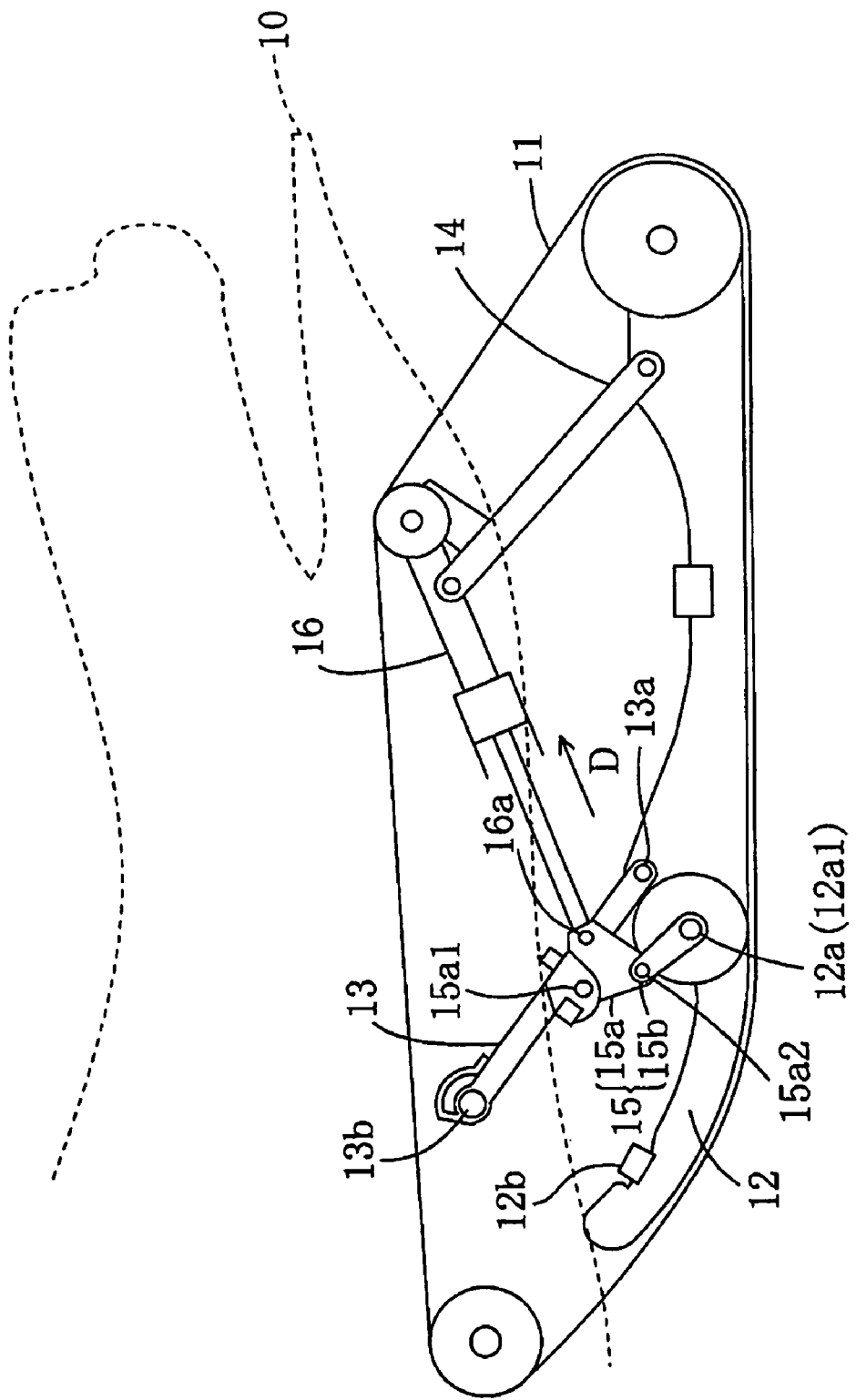
FIGS. 1A and 1B are simplified drawings illustrating a first preferred embodiment of the present invention.

FIG. 1 illustrates the main parts of a snowmobile according to a first preferred embodiment of the present invention. The snowmobile of the present preferred embodiment includes vehicle frame 10, track belt 11 to which a driving force is transferred from an engine mounted on vehicle frame 10, guide rail 12 guiding track belt 11, frontal connecting member 13 rotatably connected to vehicle frame 10 and the front of guide rail 12 at connecting member 13a, rear connecting member 14 rotatably connected to vehicle frame 10 and the rear of guide rail 12, link mechanism 15 connected to frontal connecting member 13 and guide rail 12, and shock absorber 16 connected to link mechanism 15 and rear connecting member 14. Link mechanism 15 includes first link member 15a rotatably connected to frontal connecting member 13 and second link member 15b rotatably connected to first link member 15a and guide rail 12. In the preferred embodiment illustrated in FIG. 1A, shock absorber 16 is rotatably connected to first link member 15a via connecting member 16a, and connecting member 16a is always provided above connecting member 12a connecting guide rail 12 and second link member 15b.

An end portion of shock absorber 16 is connected to link mechanism 15 between guide rail 12 and frontal connecting member 13. In other words, the end portion of shock absorber 16 is provided between guide rail 12 and frontal connecting member 13, and thus can be prevented from moving to an excessively low position such as the same height as guide rail 12. Shock absorber 16 can also be rotatably connected to second link member 15b.

Guide rail 12 is provided on the left and the right of the vehicle body and guide rail connecting member 12a is connected to the left and right guide rails 12, while second link member 15b is rotatably connected to guide rail connecting member 12a. FIG. 1A is a left side view of the right guide rail 12, and guide rail connecting member 12a has a circular cross section and extends in the left-right direction of the vehicle body. Second link member 15b is connected to guide rail 12 via guide rail connecting member 12a, and can be easily connected such that second link member 15b is rotatable with respect to guide rail 12. Connecting member 12a1 is a part of guide rail connecting member 12a that connects to second link member 15b.

Since the end portion of shock absorber 16 is connected to first link member 15a or second link member 15b above guide rail connecting member 12a, the movable range of the end portion of shock absorber 16 is limited to the region above guide rail connecting member 12a. Therefore, the end portion of shock absorber 16 moves within a range that does not come in contact with guide rail connecting member 12a while the shock absorber 16 absorbs shocks from guide rail 12. Moreover, the left and right guide rails 12 are connected via guide rail connecting member 12a, and thus the rigidity of the suspension can be readily maintained.

First link member 15a further includes connecting members respectively connected to frontal connecting member 13, second link member 15b, and shock absorber 16. Connecting member 16a of shock absorber 16 is arranged at a position that is spaced apart from the line segment 15a3 between connecting member 15a1 of frontal connecting member 13 and connecting member 15a2 of second link member 15b.

Figure 1B:
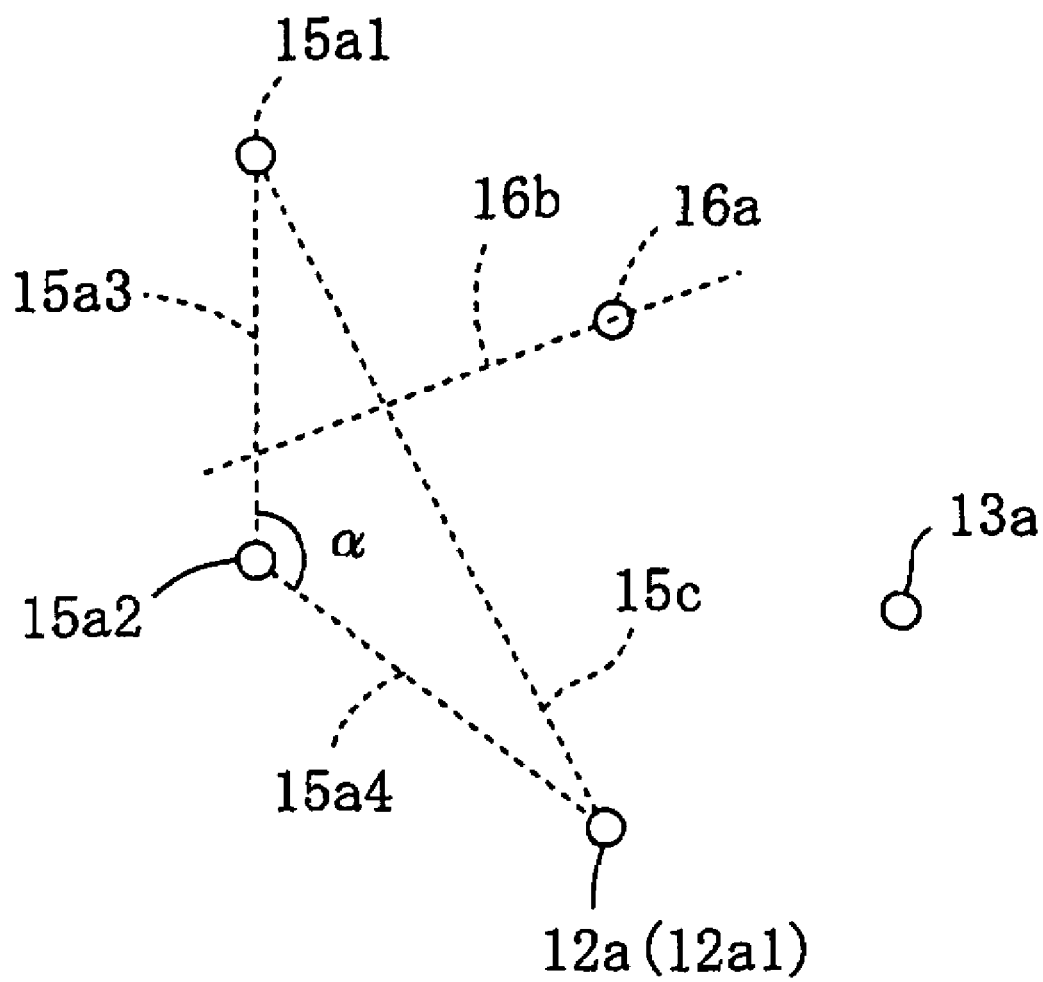

In the present preferred embodiment, first link member 15a has a substantially triangular shape and connecting members 16a, 15a1, and 15a2 are respectively arranged at the periphery of each apex of the triangle. Therefore, connecting member 16a is not positioned along the straight line between connecting member 15a1 and connecting member 15a2. FIG. 1B illustrates the position of each connecting member.

According to this structure, connecting member 16a can maintain a constant distance from connecting member 15a1 of frontal connecting member 13 and rotate around connecting member 15a1. Connecting member 16a can also maintain a constant distance from connecting member 15a2 of second link member 15b and rotate around connecting member 15a2. Therefore, shocks from guide rail 12 are indirectly transferred to shock absorber 16 from guide rail 12 and frontal connecting member 13.

More specifically, since connecting member 16a is rotatable around connecting member 15a1 and connecting member 15a2, the position of connecting member 16a (thus, the end portion of shock absorber 16) is relatively variable with respect to frontal connecting member 13 and guide rail 12. Therefore, in the present preferred embodiment, when an impact is produced on guide rail 12 and produces a shock that compresses shock absorber 16 in direction D, connecting member 16a can be moved in the opposite direction of direction D due to a counteraction from shock absorber 16 (see FIGS. 7A to 7D).

When the shock from guide rail 12 is small, as compared to a shock that is large, the runout (movement in the direction opposite to D) of connecting member 16a will be large and the compression of shock absorber 16 can be reduced. As a result, when the shock from guide rail 12 is small and a large counteraction from shock absorber 16 is not required, the stroke of shock absorber 16 can be reduced. In addition, if the shock is large, the rate of movement of connecting member 16a decreases and the compression of shock absorber 16 increases. Therefore, even if the movable range of the end portion of shock absorber 16 is limited to the region above guide rail connecting member 12a, a stroke required for producing a large counteraction from shock absorber 16 can be retained when necessary.

Furthermore, a structure in which shock absorber 16 is connected to second link member 15b can also be utilized. Specifically, by arranging connecting members of second link member 15b that respectively connect guide rail 12, first link member 15a and shock absorber 16, a connecting member of shock absorber 16 can be arranged at a position that is spaced apart from the line segment between a connecting member of guide rail 12 and a connecting member of first link member 15a. In this structure, the position of the connecting member of shock absorber 16 is also relatively variable with respect to frontal connecting member 13 and guide rail 12. Therefore, when the shock from guide rail 12 is small and a large counteraction from shock absorber 16 is not required, the stroke of shock absorber 16 can be reduced. In addition, even if the movable range of the end portion of shock absorber 16 is limited to the region above guide rail connecting member 12a, a stroke required for producing a required counteraction from shock absorber 16 can sufficiently be retained when necessary.

Next, connecting member 15a2 is always positioned in front of the line segment 15c between connecting member 15a1 and connecting member 12a1, and shock absorber 16 is positioned in such a way that extension line 16b of its axis always intersects line segment 15c, while connecting member 16a is always positioned above connecting member 12a1.

Since connecting member 15a2 is always positioned in front of the line segment 15c between connecting member 15a1 and connecting member 12a1, interior angle α formed by connecting members 15a1, 15a2, 12a1 is always less than 180 degrees. Therefore, regardless of how much shock absorber 16 is extended or compressed, first link member 15a would not rotate in such a way that connecting member 15a2 is positioned behind line segment 15c, and first link member 15a and second link member 15b would not rotate in a direction that prevents the function of shock absorber 16.

Further, since extension line 16b of the axis of shock absorber 16 always intersects line segment 15c, regardless of how much shock absorber 16 is extended or compressed, first link member 15a and second link member 15b rotate in such a way that connecting member 15a2 moves in a substantially front-rear direction. Moreover, since connecting member 16a is always positioned above connecting member 12a1, excessive rotation of second link member 15b and contact of connecting member 16a and connecting member 12a1 can be prevented.

When shock absorber 16 is in maximum extension, the sum of line segment 15a3 and line segment 15a4 (line segment from connecting member 12a1 to connecting member 15a2) is larger than line segment 15c, and connecting member 15a2 is positioned in front of line segment 15c.

Since the sum of line segment 15a3 and line segment 15a4 is larger than line segment 15c when shock absorber 16 is in maximum extension (in the present preferred embodiment illustrated in FIGS. 1A and 1B, interior angle α is in its maximum), connecting members 15a1, 15a2, 12a1 are not positioned along a straight line and interior angle α formed by connecting members 15a1, 15a2, 12a1 is always less than 180 degrees. According to such a structure, connecting member 15a2 is positioned in front of line segment 15c, and thus the rotational direction of connecting member 15a2 due to the compression of shock absorber 16 is always a forward direction. Therefore, first link member 15a and second link member 15b would not rotate in a direction that prevents the function of shock absorber 16.

The rate of movement of connecting member 16a in the opposite direction of D decreases when shock absorber 16 is compressed. The rate of movement of connecting member 15a2, which connects first link member 15a and second link member 15b, towards the direction of the extension line of the axis of shock absorber 16 (movement in the opposite direction of D) also decreases when shock absorber 16 is compressed. In addition, when shock absorber 16 is compressed, the changes in interior angle α formed by connecting member 15a1, which connects frontal connecting member 13 and first link member 15a, connecting member 15a2, which connects first link member 15a and second link member 15b, and connecting member 12a, which connects guide rail 12 and second link member 15b, also decreases.

Although frontal connecting member 13 is tilted when guide rail 12 receives an impact and the shock absorber 16 is compressed, first link member 15a and second link member 15b also rotate to change the position of connecting member 16a. Such changes in position include a front-rear movement and an up-down movement. However, in the present preferred embodiment, since the rate of movement in the front-rear direction is small when shock absorber 16 is being compressed, counteraction from shock absorber 16 can be increased according to the degree of shock.

Therefore, the shock absorbing effect of shock absorber 16 is larger when the shock from guide rail 12 is large as compared to when the shock is small, and shock absorber 16 can function more effectively when a large counteraction is demanded of shock absorber 16.

Guide rail 12 of the present preferred embodiment is bent upwards at the front of the vehicle, and buffer 12b is provided at the front portion of guide rail 12. In addition, rotation restricting member 13b is arranged to restrict the rotation of frontal connecting member 13 when buffer 12b comes into contact with frontal connecting member 13.

Therefore, when guide rail 12 receives an impact and approaches vehicle frame 10, frontal connecting member 13 rotates forward. Such rotation is restricted when rotation restricting member 13b comes into contact with buffer 12b, and frontal connecting member 13 cannot rotate further forward and exceed the rotational angle of this restricted state.

In the present preferred embodiment, when the rotation of frontal connecting member 13 is restricted by the contact of rotation restricting member 13b and buffer 12b, connecting member 16a is positioned at its lowest point. In this state, connecting member 16a is still positioned above connecting member 12a1. Therefore, even if a large load is acted upon guide rail 12, connecting member 16a does not come in contact with connecting member 12a1.

The relation between guide rail 12 and frontal connecting member 13, especially movement that front portion of guide rail 12 moves away from frontal connecting member 13 in FIG. 1A, is restricted by an elastic body (not shown in FIG. 1A, but see FIGS. 3 and 4) connected to guide rail 12 and frontal connecting member 13. Therefore, since guide rail 12 and vehicle frame 10 are separated from each other when track belt 11 is not in contact with the ground, frontal connecting member 13 rotates in the clockwise direction. An angle defined by the relation between guide rail 12 and frontal connecting member 13 does not exceed the angle in this restricted state.

In the present preferred embodiment, interior angle α is always less than 180 degrees in the condition restricted by the elastic body. Therefore, regardless of how guide rail 12 is moved due to impact and counteraction, the interior angle α will not exceed 180 degrees.

Further, first link member 15a can also include a plurality of connecting members that can be connected to shock absorber 16. For example, a plurality of holes for connecting the end portion of shock absorber 16 can be provided and the end portion of shock absorber 16 can be connected to any of these holes.

As a result, counteraction of shock absorber 16 with respect to shocks from guide rail 12 can be adjusted, and the smoothness of the ride can be varied. This also applies when shock absorber 16 is connected to second link member 15b, and a plurality of connecting members can be provided in second link member 15b. A plurality of connecting members can also be provided in both first link member 15a and second link member 15b.

The turning capability of the vehicle can be improved if the center of gravity of the load is shifted to the front by changing the connecting member of shock absorber 16. Such design also benefits riders with a small body. On the other hand, if the center of gravity of the load is shifted to the rear, forward moving capability can be improved, and such design benefits riders with a large body.

Characteristics of shock absorber 16 with respect to shocks from guide rail 12 can be varied by changing the position at which the end portion of shock absorber 16 is connected. Therefore, by setting the connecting position such that the characteristics of shock absorber 16 are decreased, the energy absorbed by shock absorber 16 can be reduced and a soft riding snowmobile can be provided. On the other hand, by setting the connecting position such that the characteristics of shock absorber 16 are increased, a snowmobile having an improved bottoming resistance with a large energy absorbance can be provided.

Preferred embodiments of the present invention will now be described in more detail.

Figure 2:
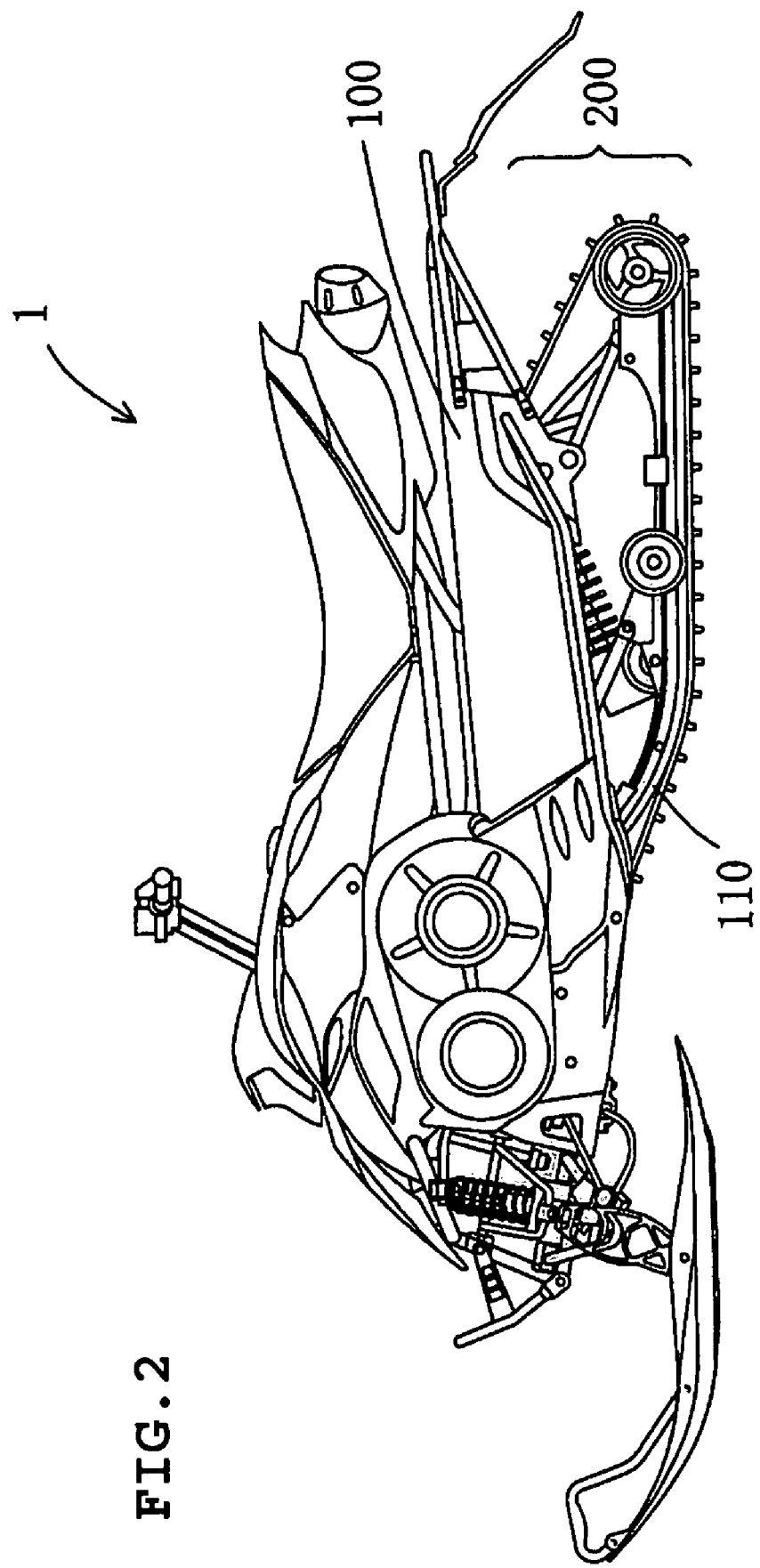
FIG. 2 is a left side view of a snowmobile according to a preferred embodiment of the present invention.

FIG. 2 is a left side view of snowmobile 1 according to a preferred embodiment of the present invention. Snowmobile 1 includes vehicle frame 100 provided across the entire vehicle, and vehicle frame 100 supports an engine provided in the front portion of the vehicle. Snowmobile 1 is driven forward and backward by transferring a driving force from the engine to track belt 110 provided in the rear portion of the vehicle.

Figure 3:
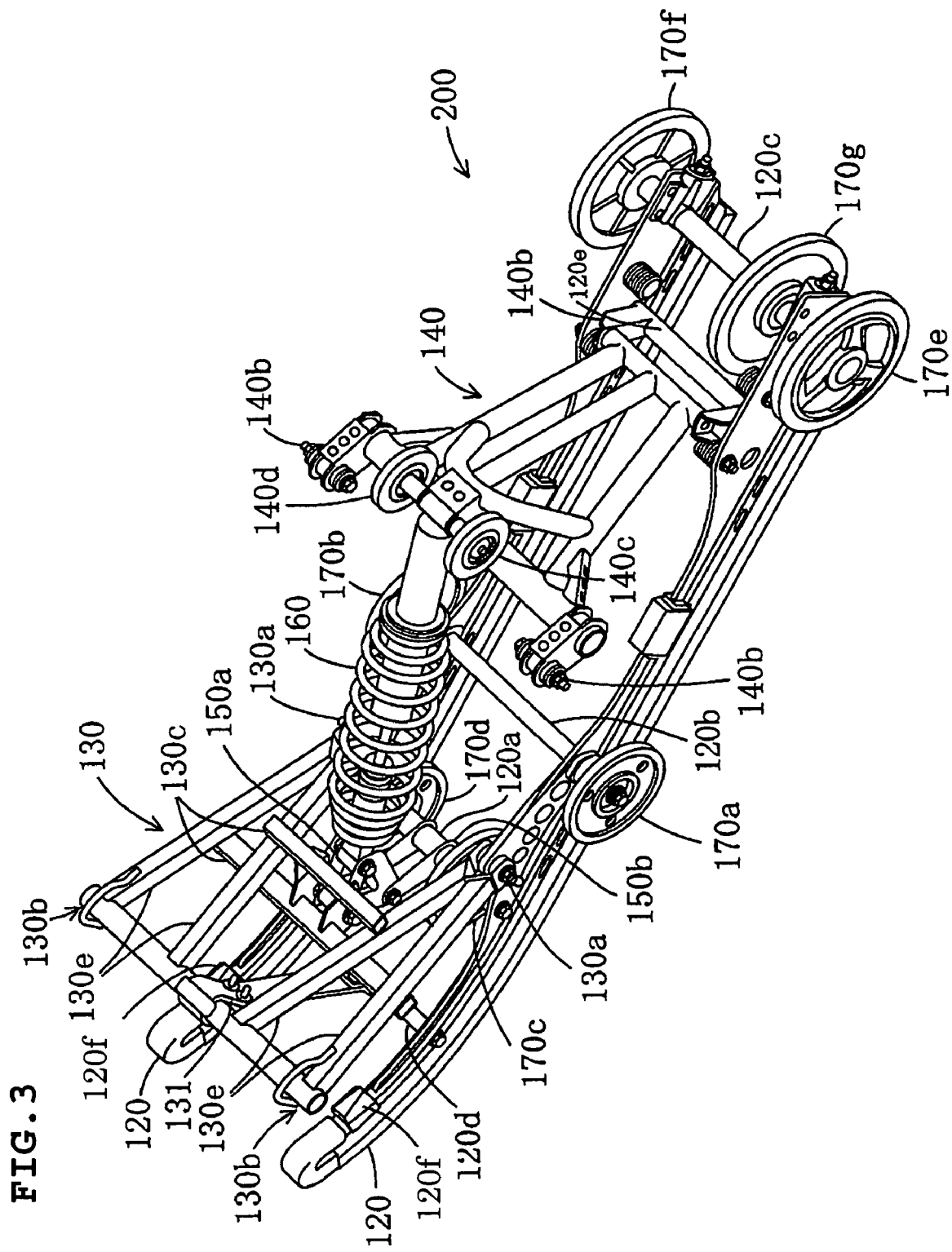
FIG. 3 is a perspective view of a suspension.
Figure 4:
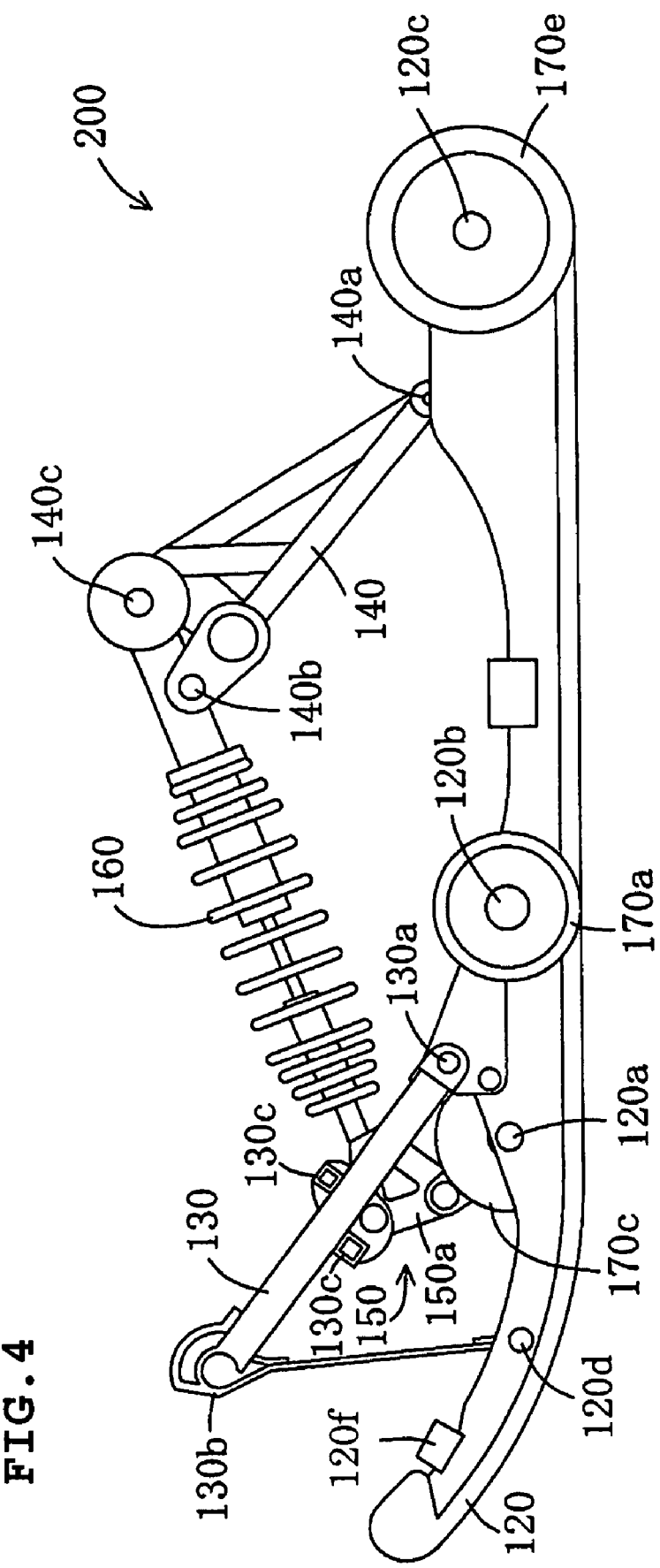
FIG. 4 is a left side view of the suspension.

Snowmobile 1 includes suspension 200 provided in the rear portion of the vehicle. FIGS. 3 and 4 illustrate suspension 200, where FIG. 3 is a perspective view and FIG. 4 is a left side view. Suspension 200. includes guide rail 120, frontal connecting member 130, rear connecting member 140, link mechanism 150, and shock absorber 160. In the present preferred embodiment, link mechanism 150 further includes first link member 150a and second link member 150b.

In the present preferred embodiment, suspension 200 is preferably a mono-shock suspension. The rear end portion of frontal connecting member 130 is connected to guide rail 120 via connecting member 130a and the front end portion of frontal connecting member 130 is connected to vehicle frame 100. Frontal connecting member 130 is rotatably connected to guide rail 120 and vehicle frame 100. Rear connecting member 140 is connected to guide rail 120 via connecting member 140a, which defines a part of guide rail 120, and to vehicle frame 100 via connecting member 140b, while rear connecting member 140 is rotatable with respect to the left-right axis of the vehicle at each connecting member 140a, 140b. The ends of shock absorber 160 are respectively connected to rear connecting member 140 and link mechanism 150.

Since link mechanism 150 is connected to frontal connecting member 130 and guide rail 120, shock absorber 160 absorbs shocks from guide rail 120 while enabling frontal connecting member 130 and rear connecting member 140 to rotate.

Guide rails 120 guide track belt 110 and are provided on the left and right of the vehicle, and are connected to each other via connecting members 120a to 120e preferably composed of round bars. In the present preferred embodiment, connecting members 120a to 120c also serve as axes of idler rollers. In other words, in the present preferred embodiment, idler rollers 170a to 170g are rotatably connected to connecting members 120a to 120c.

Idler rollers 170a to 170g are rotatable while in contact with track belt 110. Idler rollers 140c, 140d are also rotatably connected to an axis in-the left-right direction of rear connecting member 140. Therefore, by hanging on such idler rollers 170a to 170g, 140c, and 140d, track belt 110 is guided below guide rail 120 and above idler rollers 140c, 140d and can rotate about this track.

In the present preferred embodiment, guide rails 120 are provided on the left and right of the vehicle as described above, and receive impacts from the snow via track belt 110. Therefore, in order to maintain the rigidity of the vehicle, it is extremely important that connecting members 120a to 120e are connected to guide rails 120.

On the other hand, in order for the shock generated by the impact from the snow to be sufficiently absorbed by shock absorber 160, it is desirable that shock absorber 160 is designed such that a sufficient stroke can be maintained in shock absorber 160. However, the available movable range of shock absorber 160 between guide rail 120 and vehicle frame 100 is reduced once connecting members 120a to 120e are arranged as described above.

In the present preferred embodiment, connecting members 120a to 120e are arranged between guide rails 120 while link mechanism 150 serves as a connecting member for shock absorber 160 and is provided such that comfortable riding can be achieved.

Figure 5:
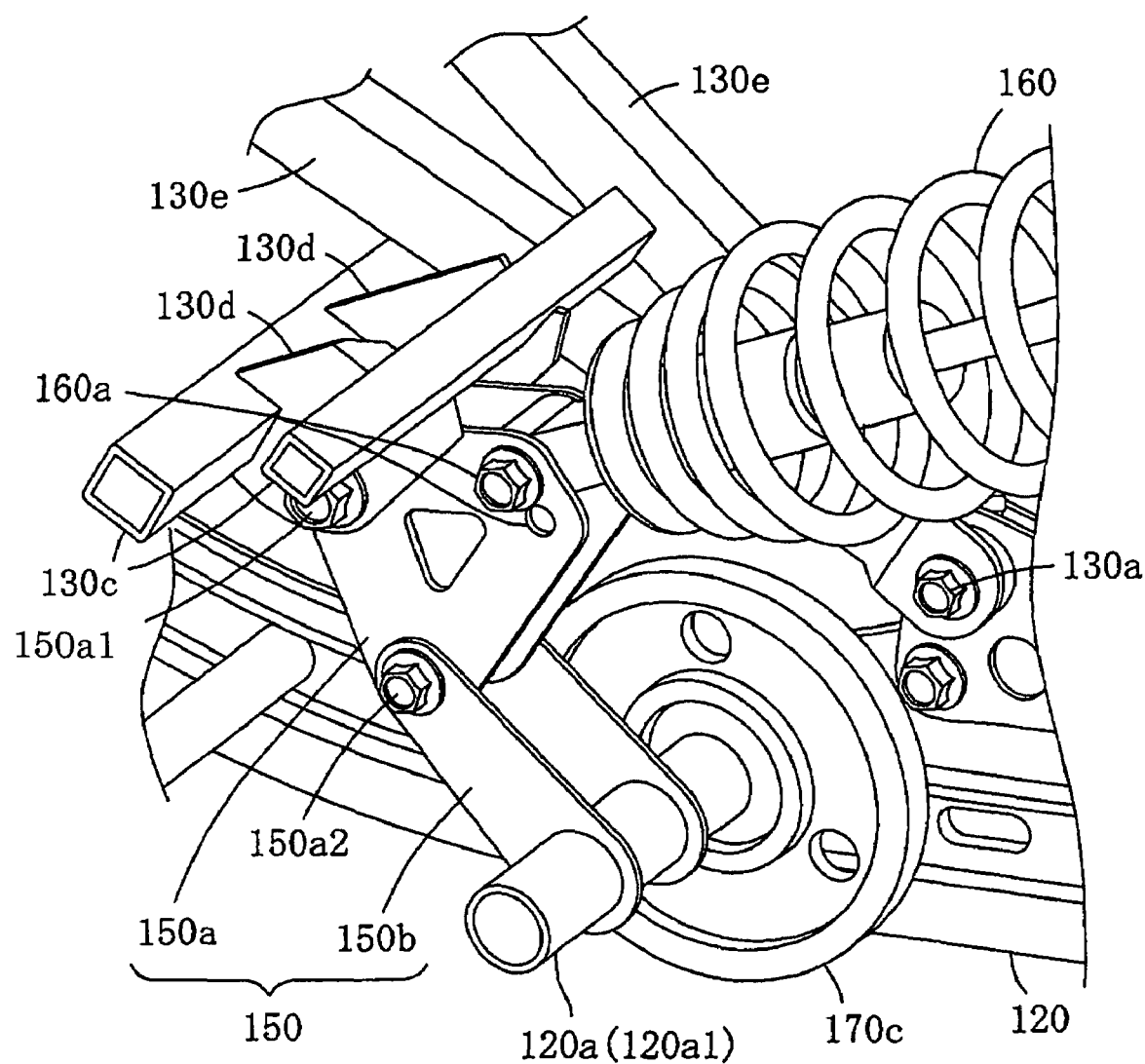
FIG. 5 is a perspective view of a link mechanism.
Figure 6:
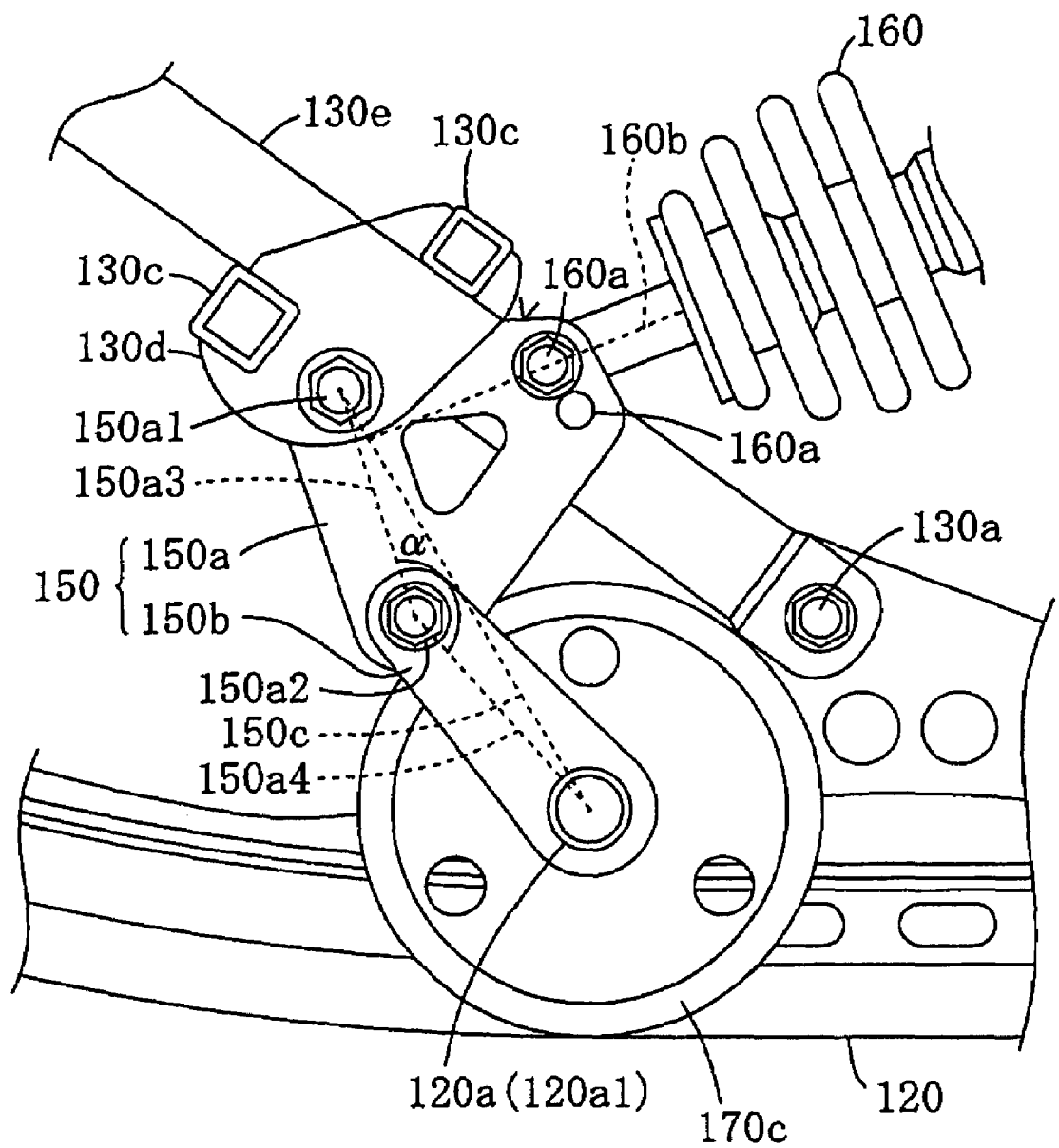
FIG. 6 is a left side view of the link mechanism.

Hereafter, the structure of link mechanism 150 will be described in detail with reference to FIGS. 5 to 7. FIG. 5 is a perspective view of link mechanism 150, and FIG. 6 is a left side view of link mechanism 150 viewed from between second link member 150b and idler roller 170c. FIGS. 7A to 7D are drawings illustrating movements of link mechanism 150 when guide rail 120 receives an impact.

Link mechanism 150 includes first link member 150a and second link member 150b. In the present preferred embodiment, first link member 150a is arranged such that two substantially triangular plates are facing each other, and holes defining the connecting members of frontal connecting member 130, second link member 150b, and shock absorber 160 are provided near the apexes of the triangles. In other words, the two plates have the same shape, and the holes are provided at the same positions in each plate. Therefore, if another member is connected by the two plates facing each other with a bolt or the like, such member can be rotatably connected to first link member 150a.

In the present preferred embodiment, a portion of first link member 150a near one apex of the triangles serves as connecting member 150a1 for connecting frontal connecting member 130. Frontal connecting member 130 includes four arms 130e, which extend diagonally forward and upward from connecting member 130a connected to guide rail 120, and two connecting members 130c connected to upper and lower portions of arms 130e and extending in the left-right direction of the vehicle. Each connecting member 130c is connected by two plates 130d at the center of the vehicle. In the present preferred embodiment, two plates defining first link member 150a are provided between the two plates 130d, and connecting member 150a1 is provided by fastening a bolt such that frontal connecting member 130 is rotatable.

In the present preferred embodiment, a portion of first link member 150a near another apex of the triangles serves as connecting member 160a for connecting shock absorber 160. In other words, in first link member 150a, two holes are arranged near this apex, and connecting member 160a is provided by fastening a bolt such that an end of shock absorber 160 between the two plates defining first link member 150a is rotatable. The holes for bolt fastening shock absorber 160 can be selected discretely.

In the present preferred embodiment, a portion of first link member 150a near another apex of the triangles serves as connecting member 150a2 for connecting second link member 150b. Second link member 150b includes two plates extending in one direction and facing each other, and the two plates defining first link member 150a are provided between the two plates of second link member 150b, and connecting member 150a2 is provided by fastening a bolt such that second link member 150b is rotatable.

The end opposite to connecting member 150a2 of second link member 150b is rotatably connected to connecting member 120a. A hole having an internal diameter substantially the same as the external diameter of connecting member 120a is provided in the end opposite to connecting member 150a2 of second link member 150b, and connecting member 120a is inserted into the hole. Therefore, second link member 150b is rotatably connected to connecting member 120a. The portion at which second link member 150b and connecting member 120a are connected is connecting member 120a1.

FIG. 6 illustrates a state in which shock absorber 160 is extended to its maximum, and in such state, connecting member 150a2 is positioned in front of line segment 150c between connecting member 150a1 and connecting member 120a1. Moreover, when shock absorber 160 is extended to its maximum, the sum of line segment 150a3 from connecting member 150a2 to connecting member 150a1 and line segment 150a4 from connecting member 120a1 to connecting member 150a2 is larger than line segment 150c. Therefore, line segment 150a3 and line segment 150a4 are not in a common straight line, and in the present preferred embodiment, the interior angle α formed by connecting members 150a1, 150a2, 120a1 is less than 180 degrees such that connecting member 150a2 is positioned in the front side of the vehicle.

Extension line 160b of the axis of shock absorber 160 is arranged such that it always intersects line segment 150c, and connecting member 160a is always positioned above connecting member 120a1. Here, the positions of the connecting members and their positions with respect to each other are evaluated according to their centers of rotation. And the lines between members are evaluated when viewed from the side (lines projecting to the side) as shown in FIG. 6. Therefore, the intersections of the straight lines in the three-dimensional space are not a strict requisite. These apply to the descriptions hereafter.

According to the above structure, when guide rail 120 receives an impact, an upward force is acted on guide rail 120 and connecting member 130a rotates to the front (in the counter clockwise direction shown in FIG. 4) such that the shock is absorbed by frontal connecting member 130. At this time, since connecting member 150a1 approaches connecting member 120a1, as shown in FIG. 6, first link member 150a rotates in the clockwise direction with connecting member 150a1 serving as the center point.

In the present preferred embodiment, as described above, first link member 150a and second link member 150b are connected by connecting member 150a2, and when shock absorber 160 is extended to its maximum, the sum of line segment 150a3 from connecting member 150a2 to connecting member 150a1 and line segment 150a4 from connecting member 120a1 to connecting member 150a2 is larger than line segment 150c, and connecting member 150a2 is positioned in front of line segment 150c between connecting member 150a1 and connecting member 120a1. Therefore, when first link member 150a in FIG. 6 rotates, it only rotates in the clockwise direction, and at the same time, second link member 150b rotates in the counter clockwise direction with connecting member 120a1 serving as the center point.

When guide rail 120 receives an impact and frontal connecting member 130 rotates in the counter clockwise direction, rear connecting member 140 in FIG. 4 also rotates with respect to vehicle frame 100. In the present preferred embodiment, since frontal connecting member 130 and rear connecting member 140 move closer to each other when they rotate, shock absorber 160 is compressed according to such movement thereby absorbing the shock from the guide rail 120. According to such movement, counteraction generated when shock absorber is being compressed acts on the axis line of shock absorber 160.

In the present preferred embodiment, extension line 160b of the axis of shock absorber 160 is arranged such that it always intersects line segment 150c, and line segment 150c is always provided between connecting member 150a1 and connecting member 120a1. Therefore, when the force that compresses shock absorber 160 is generated, counteraction from shock absorber 160 always acts between connecting member 150a1 and connecting member 120a1. Further, since FIG. 6 shows the state in which shock absorber 160 is extended to its maximum, when shock absorber 160 is being compressed, first link member 150a in FIG. 6 will only rotate in the clockwise direction and second link member 150b will only rotate in the counter clockwise direction.

In the present preferred embodiment, the distance between connecting member 150a1 and connecting member 160a in the entire movable range of frontal connecting member 130 is such that it is shorter than line segment 150c between connecting member 150a1 and connecting member 120a1, and connecting member 160a is always positioned above connecting member 120a1. Therefore, regardless of how frontal connecting member 130 rotates when guide rail 120 receives an impact, shock absorber 160 can effectively function within the entire movable range of frontal connecting member 130 without contacting connecting member 160a and connecting member 120a1.

In the present preferred embodiment, buffer 120f is provided at the front portion of guide rail 120. In addition, the front end of frontal connecting member 130 extends in the left-right direction of the vehicle, and rotation restricting member 130b is arranged at the end of such left and right sides. Further, the distance between the connecting member 130a and buffer 120f is substantially equal to the distance between connecting member 130a and rotation restricting member 130b, and buffer 120f and rotation restricting member 130b come into contact with each other when frontal connecting member 130 is tilted forward into a substantially horizontal position.

Therefore, the forward inclination of frontal connecting member 130 is restricted by the contact of buffer 120f and rotation restricting member 130b. As a result, the movable range of frontal connecting member 130 when it is tilted forward is restricted by buffer 120f and rotation restricting member 130b, and in the present preferred embodiment, even if the frontal connecting member 130 is tilted forward to its maximum state, the connecting member 130 is still provided above connecting member 160a and connecting member 120a1.

Further, in the present preferred embodiment, the rotation of first link member 150a in the counter clockwise direction is restricted by a band 131 (elastic body) provided between frontal connecting member 130 and connecting member 120d.

Guide rail 120 might temporarily suspend in the air when snowmobile 1 traverses a gap. However, in the present preferred embodiment, even if such an incident occurs, the rotation of frontal connecting member 130 is restricted by band 131. Therefore, the interior angle formed by connecting members 150a1, 150a2, 120a1 will not exceed 180 degrees, and first link member 150a will not rotate in the counter clockwise direction and decrease the effect of shock absorber 160.

Figure 7A:
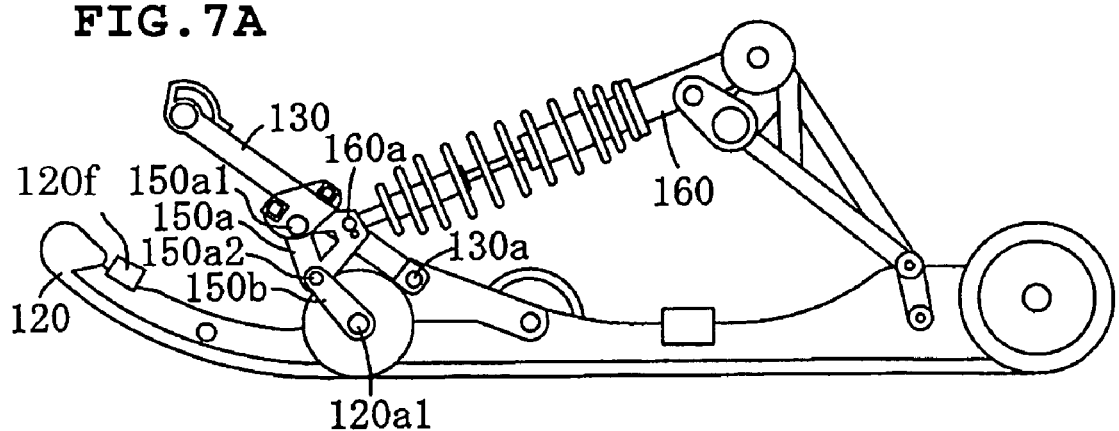
FIGS. 7A to 7D are drawings illustrating movements of the link mechanism.
Figure 7B:
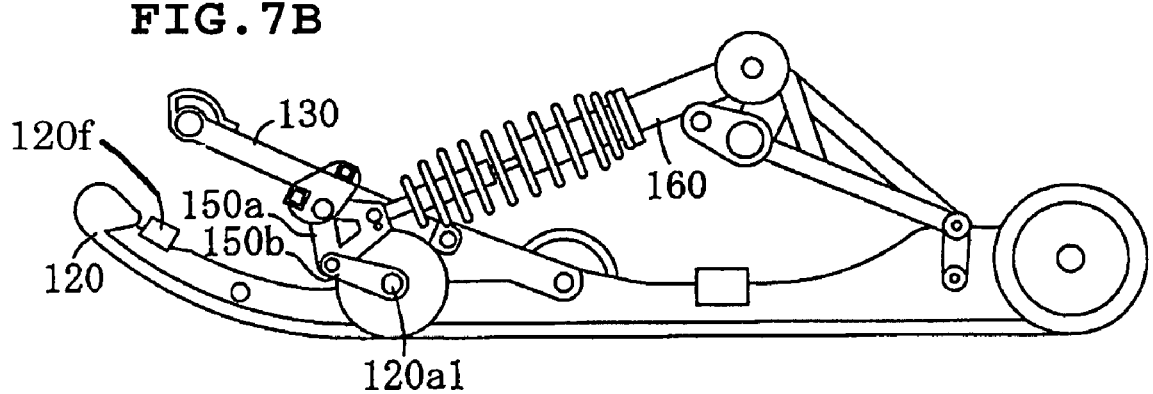
Figure 7C:
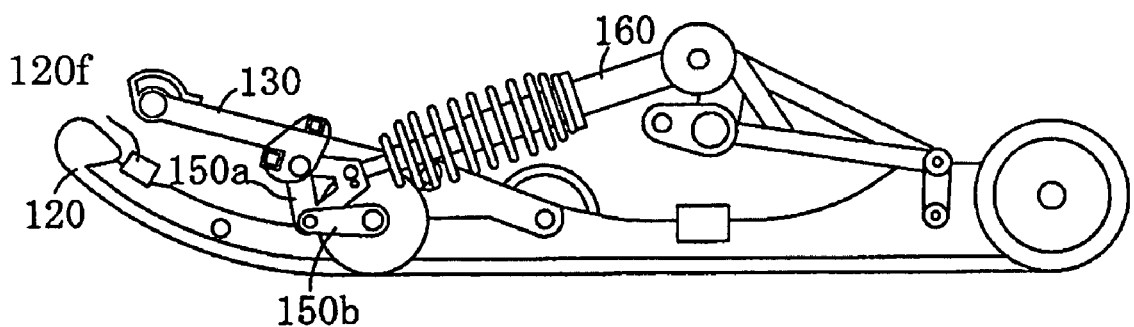
Figure 7D:
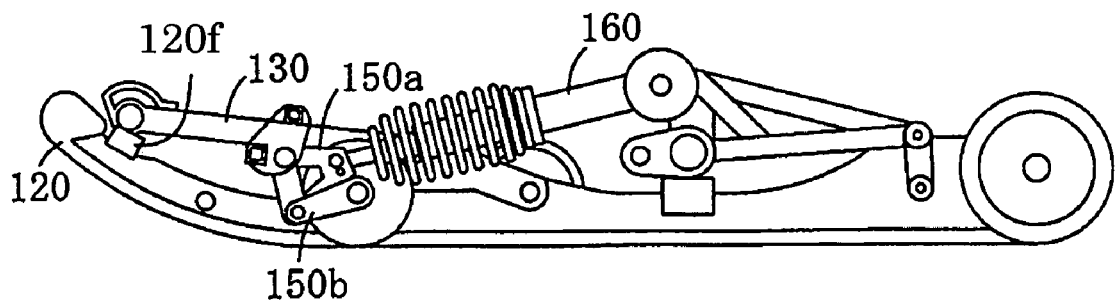

FIGS. 7A to 7D are drawings depicting movements of the link mechanism when shock absorber 160 is being compressed, and illustrating left side views of link mechanism 150 and guide rail 120 viewed from between second link member 150b and idler roller 170c as the stroke of shock absorber 160 varies. Specifically, FIG. 7A illustrates shock absorber 160 when it is extended to its maximum, and the stroke of shock absorber 160 gradually increases in the order of FIGS. 7A, 7B, 7C, and 7D. FIG. 7D shows rotation restricting member 130b and buffer 120f coming into contact with each other when frontal connecting member 130 is tilted to its maximum.

More specifically, as shown in FIGS. 7A to 7D, if the impact received by guide rail 120 increases from small to large, the distance between connecting member 150a1 and connecting member 120a1 decreases generally. In other words, the distance between connecting member 150a1 and connecting member 120a1 is at its largest when shock absorber 160 is extended to its maximum and gradually decreases when shock absorber 160 is being compressed. However, the rate of decrease might not be uniform.

In the present preferred embodiment, when shock absorber 160 is extended or compressed to its maximum, it is sufficient as long as the distance between connecting member 150a1 and connecting member 120a1 is long in the former case and generally short in the latter case. In other words, it is not required for the decreasing rate to decrease uniformly when shock absorber 160 is in the state of being compressed to its maximum or near to such a state.

The decreasing rate can be controlled by the position of connecting member 150a1, the position of connecting member 120a1, and the position of connecting member 130a. Specifically, if the position of connecting member 150a1 and the position of connecting member 130a are fixed and the position of connecting member 120a1 is shifted to the front portion of the vehicle, the decreasing rate would not decrease uniformly as describe above, and the inclination of the decreasing rate to reverse with respect to frontal connecting member 130 increases. Therefore, the reverse of the decreasing rate is permissible and various settings are possible as long as the distance between connecting member 150a1 and connecting member 120a1 is generally short according to the rotation of connecting member 130.

The changes of interior angle $\alpha$ (see FIG. 6) formed by connecting member 150a1, connecting member 150a2 and connecting member 120a1 can be determined by the relationship between the positions of connecting member 150a1, connecting member 120a1 and connecting member 130a. Therefore, when shock absorber 160 is gradually being compressed from the state when it is extended to its maximum, the changes of interior angle $\alpha$ would be large initially (near the state when it is extended to its maximum) and decreases as shock absorber 160 is being compressed. Here, it is sufficient as long as the changes are generally and uniformly decreasing.

In the present preferred embodiment, as illustrated in FIGS. 7A to 7D, interior angle $\alpha$ is near 180 degrees when shock absorber 160 is extended to its maximum, and gradually becomes an acute angle. Here, the runout of shock absorber 160 increases when interior angle $\alpha$ is near 180 degrees, and decreases when interior angle $\alpha$ becomes more acute. Therefore, the shock absorbing effect of shock absorber 160 is larger when the impact received by guide rail 120 is large, as compared to a small impact, and shock absorber 160 can function more effectively when a large counteraction is required thereof.

In addition, in the present preferred embodiment, since first link member 150a is preferably a triangular member and connecting member 160a is not coincident with line segment 150a3, the distance between connecting member 160a and connecting member 150a2 can always be maintained at a constant. As a result, connecting member 160a can extremely easily be designed to be positioned above connecting member 120a1, and connecting member 160a and connecting member 120a can extremely easily be prevented from coming into contact with each other.

As described above, in the present preferred embodiment, the rigidity of the vehicle can be maintained by connecting the left and right guide rails 120 with connecting member 120a. Therefore, the movable range of connecting member 160a is limited to a region above connecting member 120a such that connecting member 160a and connecting member 120a do not come into contact with each other. Moreover, in the present preferred embodiment, the required counteraction from shock absorber 160 with respect to the degree of the shock can be achieved by the combination of first link member 150a and second link member 150b. Therefore, even though the movable range of shock absorber 160 is limited by connecting member 120a as in the present preferred embodiment, the required counteraction from shock absorber 160 can readily be generated, while at the same time maintaining the rigidity of the vehicle.

Further, in the present preferred embodiment, two holes are provided near one of the apexes of first link member 150a, and any hole can be used to serve as connecting member 160a of shock absorber 160, as described above. Therefore, the connecting position of shock absorber 160 can vary.

The front-rear balancing position of the counteraction in suspension 200 can be adjusted by varying the connecting position of shock absorber 160. As a result, the turning capability and forward moving capability can be adjusted. More specifically, in the present preferred embodiment, since the two holes in first link member 150a are provided in different positions in the front-rear direction, the position of the center of gravity of the load can vary in the front-rear direction by selecting either of the holes.

In the present preferred embodiment, since shifting the center of gravity of the load to the front is equivalent to shortening the effective wheelbase for the entire vehicle, as compared to the case where the center of gravity of the load is at the rear, turning capability can be improved. Moreover, this setting enables easy turning operation and might benefit riders with small bodies. On the other hand, when the center of gravity of the load is shifted to the rear, forward moving capability can be improved and this setting might benefit riders with large bodies.

Further, since the movable range of connecting member 160a varies according to its position, the stroke of shock absorber 160 can be varied with respect to the shock from guide rail 120. Therefore, by arranging connecting member 160a in the frontal region, the stroke of shock absorber 160 is decreased and a soft-riding snowmobile can be provided, while arranging connecting member 160a in the rear region, the stroke of shock absorber 160 is increased and a snowmobile with a large energy absorption can be provided.

Figure 8:
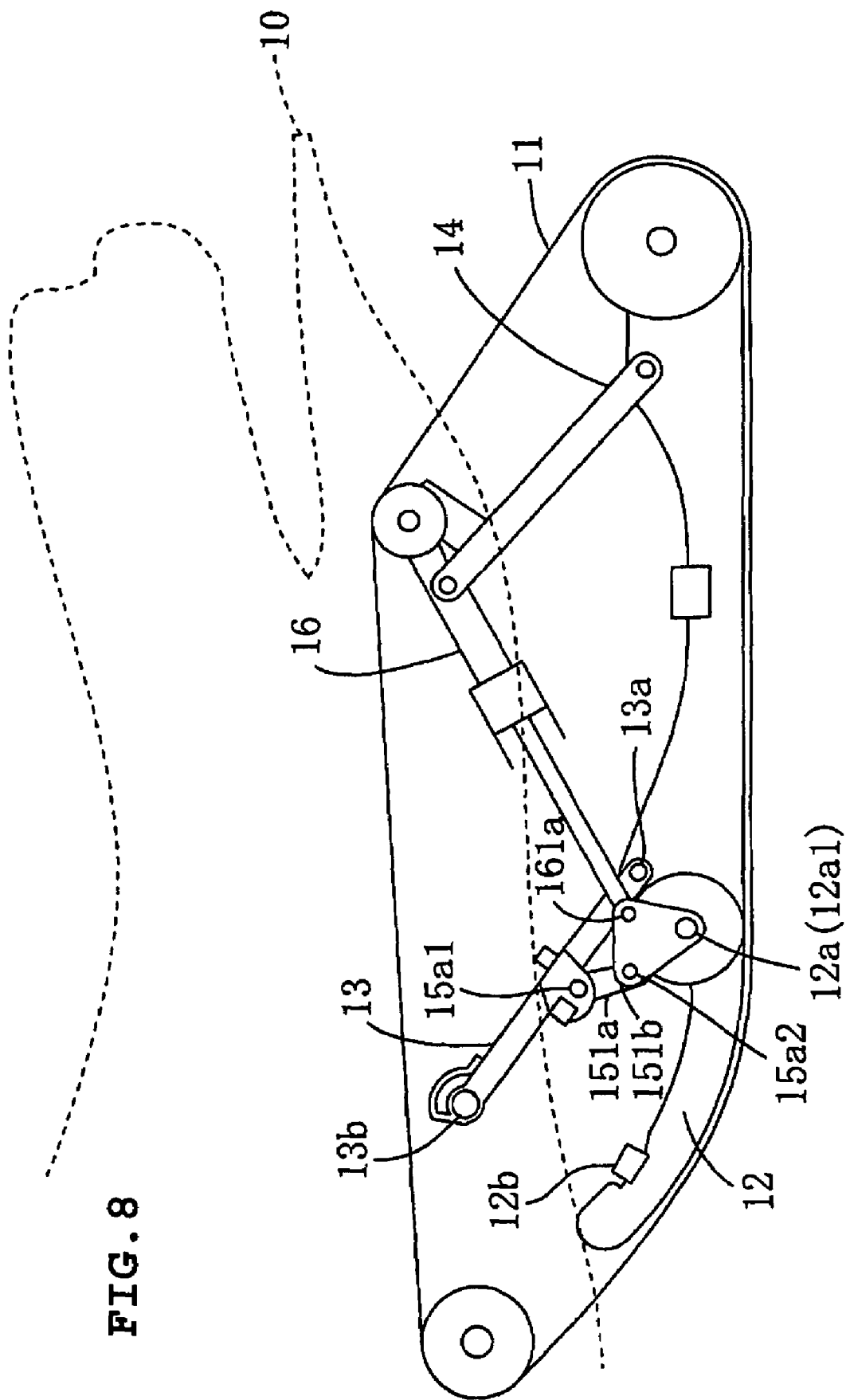
FIG. 8 is a simplified drawing illustrating another preferred embodiment.

The above-described preferred embodiments are only one preferred embodiments of the present invention, and the present invention is not limited to such preferred embodiments. For example, the shock absorber can be connected to the second link member. FIG. 8 is a drawing illustrating the main parts of another preferred embodiment of the present invention. In FIG. 8, the same reference characters are used for parts that are the same as those illustrated in FIG. 1A. In this preferred embodiment, second link member 151b is substantially triangular in shape and includes two substantially triangular plates facing each other. In addition, connecting member 161a for connecting shock absorber 16, connecting member 15a2 for connecting first link member 151a, and connecting member 12a1 for connecting guide rail connecting member 12a are respectively provided near the end of each apex.

First link member 151a includes two plates extending in a direction and facing each other, and connecting member 15a1 for connecting frontal connecting member 13 and connecting member 15a2 for connecting second link member 151b are arranged on both ends of the plates. According to the above-described structure, the rigidity of the vehicle can be maintained by connecting the left and right guide rails 12 via guide rail connecting member 12a. Moreover, by providing a link mechanism by combining first link member 151a and second link member 151b, the required counteraction from shock absorber 16 with respect to the degree of shock can be achieved.

In addition, in the above-described preferred embodiment, two holes are provided in first link member 151a such that the connecting position of connecting member 161a can be varied. However, in order to maintain the rigidity of the vehicle and achieve the required counteraction from shock absorber 16 with respect to the degree of shock, it is not necessary to provide two holes in first link member 151a. In other words, it is sufficient to provide only one hole for connecting shock absorber 16. Three or more holes can also be provided in first link member 151a and any one of these holes can be selected, and two or more holes can also be provided in second link member 151b. Therefore various structures can be utilized.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
   a vehicle frame;
   a track belt to which driving force is transferred from an engine mounted on the vehicle frame;
   a guide rail guiding the track belt;
   a frontal connecting member rotatably connected to the vehicle frame and the guide rail in a front end of the snowmobile;
   a rear connecting member rotatably connected to the vehicle frame and the guide rail in a rear end of the snowmobile;
   a link mechanism connected to the frontal connecting member and the guide rail, the link mechanism including a first link member rotatably connected to the frontal connecting member, and a second link member rotatably connected to the first link member and the guide rail;
   a first connecting member;
   a second connecting member; and
   a shock absorber connected to the link mechanism and the rear connecting member; wherein
   the shock absorber is rotatably connected to the first link member or the second link member via said first connecting member, and the first connecting member is provided above said second connecting member which connects the guide rail and the second link member.

2. The snowmobile according to claim 1, wherein the guide rail includes a guide rail disposed on the left and the right of the snowmobile and further includes a guide rail connecting member connecting the guide rails disposed on the left and the right of the snowmobile, and the second link member is rotatably connected to the guide rail connecting member.

3. The snowmobile according to claim 1, wherein the first link member includes a third connecting member and a fourth connecting member; the first connecting member is respectively connected to the second link member, the frontal connecting member, and the shock absorber; and the first connecting member is arranged at a position that is spaced apart from a line segment connecting the third connecting member and the fourth connecting member.

4. The snowmobile according to claim 1, wherein the second link member includes the first connecting member, the second connecting member and a third connecting member respectively connected to the shock absorber, the guide rail and the first link member; and the first connecting member connected to the shock absorber is arranged at a position that is spaced apart from a line segment connecting the second connecting member and the third connecting member.

5. The snowmobile according to claim 1, wherein the sum of a first line segment and a second line segment is larger than a third line segment; the first line segment extending from a third connecting member connecting the first link member and the second link member to a fourth connecting member connecting the frontal connecting member and the first link member, the second line segment extending from the second connecting member to the third connecting member, and the third line segment extending from the fourth connecting member to the second connecting member; and the third connecting member is positioned further to the front of the snowmobile than the third line segment.

6. The snowmobile according to claim 1, wherein a third connecting member connects the first link member and the second link member, the third connecting member is arranged such that the rate of movement of the third connecting member decreases continuously in a direction of a line extending from a longitudinal axis of the shock absorber when the shock absorber is continuously compressed.

7. The snowmobile according to claim 1, wherein a third connecting member connects the first link member and the second link member, and a fourth connecting member connects the frontal connecting member and the first link member; and a variation of an interior angle formed by the fourth connecting member, the third connecting member and the second connecting member decreases continuously when the shock absorber is continuously compressed.

8. The snowmobile according to claim 1, wherein the guide rail includes an upwardly curved portion at a front portion of the snowmobile and a buffer provided at the front portion of the snowmobile, and the frontal connecting member includes a rotation restricting member which restricts a rotation of the frontal connecting member by contacting the buffer.

9. The snowmobile according to claim 1, wherein either the first link member or the second link member or both the first link member and the second link member include(s) a plurality of connecting members connected to the shock absorber.

10. A snowmobile comprising:
    a vehicle frame;
    a track belt to which driving force is transferred from an engine mounted on the vehicle frame;
    a guide rail guiding the track belt;
    a frontal connecting member rotatably connected to the vehicle frame and the guide rail in a front end of the snowmobile;
    a rear connecting member rotatably connected to the vehicle frame and the guide rail in a rear end of the snowmobile;
    a first link member rotatably connected to the frontal connecting member;
    a second link member rotatably connected to the first link member and the guide rail; and
    a shock absorber connected to either the first link member or the second link member and the rear connecting member; wherein
    a first connecting member connecting the first link member and the second link member is positioned further to the front of the snowmobile than a first line segment connecting a second connecting member connecting the frontal connecting member and the first link member and a third connecting member connecting the guide rail and the second link member;

the shock absorber is arranged such that a line extending from a longitudinal axis of the shock absorber intersects the first line segment; and a fourth connecting member connecting the shock absorber to either the first link member or the second link member is positioned above the third connecting member.

11. The snowmobile according to claim 10, wherein the guide rail includes a guide rail disposed on the left and the right of the snowmobile and further includes a guide rail connecting member connecting the guide rails disposed on the left and the right of the snowmobile, and the second link member is rotatably connected to the guide rail connecting member.

12. The snowmobile according to claim 10, wherein the first link member includes the first connecting member, the second connecting member, and the fourth connecting member respectively connected to the second link member, the frontal connecting member and the shock absorber; and the fourth connecting member is arranged at a position that is spaced apart from a second line segment connecting the first connecting member and the second connecting member.

13. The snowmobile according to claim 10, wherein the second link member includes the fourth connecting member, the third connecting member, and the first connecting member respectively connected to the shock absorber, the guide rail, and the first link member; and the fourth connecting member connected to the shock absorber is arranged at a position that is spaced apart from a third line segment connecting the third connecting member and the first connecting member.

14. The snowmobile according to claim 10, wherein the sum of a second line segment and a third line segment is larger than the first line segment; the second line segment extending from the first connecting member to the second connecting member, the third line segment extending from the third connecting member to the first connecting member, and the third line segment extending from the second connecting member to the third connecting member; and the first connecting member is positioned further to the front of the snowmobile than the first line segment.

15. The snowmobile according to claim 10, wherein the first connecting member is arranged such that the rate of movement of the first connecting member decreases continuously in a direction of a line extending from the axis of the shock absorber when the shock absorber is continuously compressed.

16. The snowmobile according to claim 10, wherein a variation of an interior angle formed by the second connecting member, the first connecting member, and the third connecting member decreases continuously when the shock absorber is continuously compressed.

17. The snowmobile according to claim 10, wherein the guide rail includes an upwardly curved portion at a front portion of the snowmobile and a buffer provided at the front portion of the snowmobile, and the frontal connecting member includes a rotation restricting member which restricts a rotation of the frontal connecting member by contacting the buffer.

18. The snowmobile according to claim 10, wherein either the first link member or the second link member or both the first link member and the second link member include(s) a plurality of connecting members connected to the shock absorber.

* * * * *